(12) United States Patent
Korst

(10) Patent No.: US 6,415,328 B1
(45) Date of Patent: Jul. 2, 2002

(54) SYSTEM FOR RETRIEVING DATA IN A VIDEO SERVER

(75) Inventor: Johannes H. M. Korst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/083,693

(22) Filed: May 21, 1998

(30) Foreign Application Priority Data

May 26, 1997 (EP) .......................................... 97201590

(51) Int. Cl.[7] .............................................. G06F 13/00
(52) U.S. Cl. ........................................... 709/232; 348/7
(58) Field of Search ..................... 348/7; 395/200.47, 395/200.48, 200.49, 200.09, 672, 826, 650; 709/217, 218, 219, 105, 230–237; 711/114, 157, 167–169

(56) References Cited

U.S. PATENT DOCUMENTS

| | | | | |
|---|---|---|---|---|
| 5,414,845 A | * | 5/1995 | Behm et al. ................. | 395/650 |
| 5,712,976 A | * | 1/1998 | Falcon, Jr. et al. ..... | 395/200.09 |
| 5,828,879 A | * | 10/1998 | Bennett ...................... | 395/672 |
| 5,926,649 A | * | 7/1999 | Ma et al. .................... | 395/826 |
| 6,018,359 A | * | 1/2000 | Kermode et al. .............. | 348/7 |
| 6,061,732 A | * | 5/2000 | Korst et al. ................. | 709/231 |
| 6,138,221 A | * | 10/2000 | Korst et al. ................. | 711/167 |

OTHER PUBLICATIONS

"Randomized Data Allocation for Real–Time Disk I/O", COMPCON '96 (41st EE Computer Society International Conference, Santa Clara, Feb. 25–28, 1996).
"Balanced Allocations" of Y. Azar E.A. ACM Symposium on the Theory of Computing, pp. 593–602, 1994.
"Algoritham Graph Theory", Alan Gibson, Cambridge University Press, 1989, pp. 96–106.

\* cited by examiner

*Primary Examiner*—David Wiley
(74) *Attorney, Agent, or Firm*—Daniel J. Piotrowski

(57) ABSTRACT

In an audio/video server blocks of data are read from a storage medium by a reader and supplied to users in the form of data streams. The storage medium includes a plurality of storage units. The blocks are stored in at least two different and randomly selected storage units. A scheduler controls reading of blocks from the storage medium. For each block to be read, the scheduler selects one storage unit from the storage units in which the block is stored such that the playback load on the storage units is balanced. The scheduler issues a read request to the reader for reading the block from the selected storage unit.

10 Claims, 5 Drawing Sheets

Figure 1:
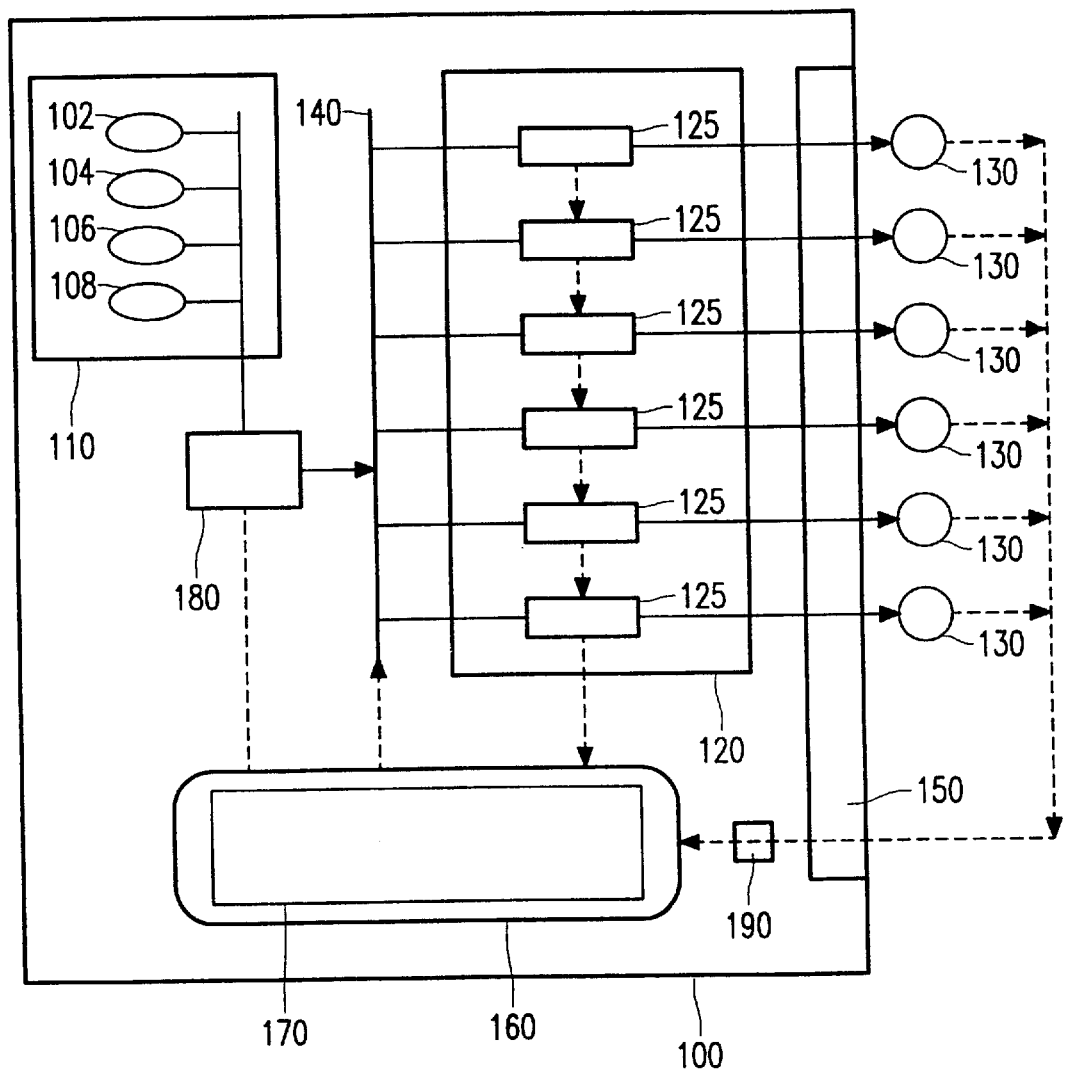

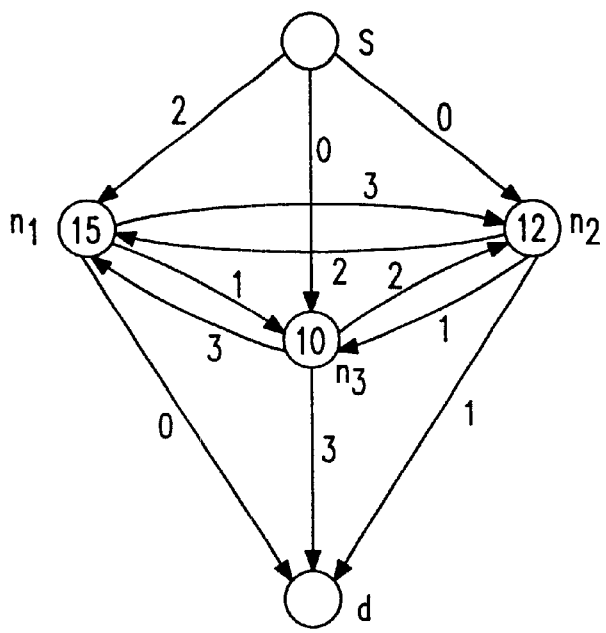
FIG. 4a
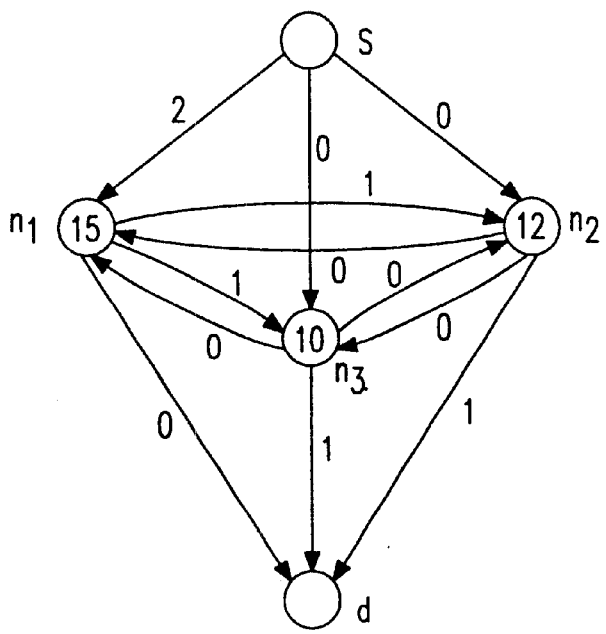
FIG. 4b
n₁ (13)    (12) n₂
(11) n₃
FIG. 4c

SYSTEM FOR RETRIEVING DATA IN A VIDEO SERVER

The invention relates to a system for retrieving blocks of data, such as audio and/or video data, from a storage medium and supplying the blocks in the form of a plurality of at maximum $N_{max}$ data streams to users, wherein each data stream has an identical maximum consumption rate of $R_{max}$ data elements per second and the storage medium has a bandwidth of at least $N_{max}*R_{max}$ data elements per second; the storage medium comprising a plurality of storage units.

A system of this kind is used in a multimedia server and, more specifically, in a video on demand or near video on demand server. A general requirement in such systems is to supply a continuous, un-interrupted stream of data to each active user. Typically, data is read from a conventional storage medium, such as hard disks, which are arranged in a disk array, such as a RAID system. In general, a distinction can be made between a fixed consumption rate and a variable consumption rate system. In a fixed consumption rate system data is, typically, supplied to a user as a fixed rate data stream. Usually, the rate is identical for each stream in the system. An example of such a system is a near-video-on-demand system, wherein a number of films can be played in parallel and the same film may be played several times in parallel, where regularly, for instance, every five or fifteen minutes, a new copy of the same film is started. In a variable consumption rate system the rate at which a user consumes data varies over time. Typically, a maximum consumption rate can be defined for each data stream. In practice, usually an identical maximum consumption rate is used for all streams, although it may be possible to efficiently support streams with different maximum consumption rates ( e.g. one maximum for an audio stream and another maximum for a combined video and audio stream). Variable consumption rate systems are, for instance, used for systems which support VCR-like functions such as pause or slow motion, or systems which use a data compression scheme with a variable bit rate, such as MPEG-2.

To supply data to a user as a continuous data stream, special scheduling schemes for reading data from the disks are required with an appropriate scheme for temporarily buffering the read data before the data is supplied to the user. For a fixed consumption rate system, typically, at fixed regular intervals for each stream a fixed amount of data (sufficient to last one period) is read and stored in the buffer. Within a variable consumption rate system, different streams may empty a predetermined block of the buffer at different moments. Typically, during an interval only data is read for streams whose buffers have room for a block of data. Other streams are skipped. As a consequence, the duration of the interval for reading data is variable, bounded by the situation in which all active streams require a new data block.

To guarantee a large disk bandwidth, which is required when all data streams consume at the maximum data rate, the data is usually striped across all disks in the array. Particularly for variable data rate systems this is achieved by partitioning each data block over all disks, such that a request for reading this block implies a disk access to each of the disks. As a result, the load on the disks is optimally balanced.

In general the number of disks in the disk array is determined by the required bandwidth in view of the number of data streams which are supported in parallel. As such, the number of disks linearly grows with the maximum number of data streams. In order to ensure that the effectiveness of accessing a disk remains more or less constant, the size of a block read from an individual disk for one data stream should remain the same (reading too small blocks of a disk increases the overhead, particularly if the size drops below the size of a track). As a consequence, the size of the accumulated block, which is striped over all disks, grows linearly with the number of disks and, as such, with the maximum number of data streams. This results in the size of the buffer also growing linearly with the maximum number of data streams. Since for each data stream a buffer is required, the combined effect is that the total size of the buffer depends substantially quadratically on the maximum number of data streams, making the costs of the buffer a dominant factor, particularly, for systems supporting a large number of data streams. A further negative effect is that the response time of the system for allowing a new data stream to become active increases substantially linearly, since the time interval required to re-fill the buffers increases linearly and during such interval no new users can enter the system.

It is an object of the invention to provide a system of the kind set forth in which the buffer costs grow substantially linearly with the maximum number of supported data streams. A further object is to provide such a system wherein the response time remains substantially the same regardless of the maximum number of supported data streams.

To achieve this object, the system according to the invention is characterised in that a predetermined selection of blocks is stored multiple times in the storage medium by individual blocks of the selection being stored in its entirety in at least two different and randomly selected storage units; and the system comprises:

a scheduler for controlling reading of blocks for the data streams from the storage medium by, for each block, selecting from a corresponding set of all storage units in which the block is stored one storage unit from which the block is to be read and assigning a corresponding read request to the selected storage unit; the scheduler being operative to select the storage unit from the set such that the load on the plurality of storage units is balanced; and a reader for, in response to a block read request, reading the corresponding block from the assigned storage unit for supply in the corresponding data stream to a user.

By ensuring that a block is stored in at least two different storage units, the scheduler has a choice in selecting from which of the storage units the block is read during play-back. This makes it possible for the scheduler to choose the storage units in such a way that the load on the storage units is balanced. By storing the blocks in randomly selected storage units a relatively even load can be achieved during playback even for variable rate systems for which it is otherwise difficult or even impossible to predict how the load on individual storage units will develop in time for the active streams. In a simple system, all blocks of all titles are stored twice in the system, i.e. in two different storage units of the system. The selection of blocks may alternatively be a part of all blocks, where the remaining blocks are stored only once.

The solution offered by the system according to the invention benefits from the insight that, unlike the bandwidth, capacity of the storage medium is not a major determining factor and increasingly will become less of a determining factor since capacity of hard-disks grows on average at a higher rate (typically 60% a year) than the bandwidth (typically a growth of 40% a year). Assuming that in two years time a typical disk will have a storage capacity of 25 Gbyte and a guaranteed data rate of 85 Mbits/sec, the following two scenario's can be envisioned.

In a first scenario, a video on demand version of the system according to the invention is used to offer a range of up to 20 films, like in a cinema, to a maximum of a 1000 users. The films are encoded using MPEG2 at an average rate of 4 Mbits/sec. Assuming that on average a film has a length of 90 min., a total storage capacity of $90*60*4.10^6=21.6*10^9$ bits=2.5 Gbyte per film is required, resulting in a total required storage capacity of approximately 50 Gbyte. If all blocks are stored twice, the capacity will have to be approximately 100 Gbyte, corresponding to 4 or 5 disks. To be able to support simultaneously 1000 users, a total guaranteed bandwidth is required of 4000 Mbits/sec, which corresponds to 47 disks. Only if in such a system it is required to store over 235 films the storage capacity of the disks becomes relevant. In a more moderate second scenario in which the system according to the invention is used to offer up to a hundred users a choice of films, as is typical for a hotel, with respect to the bandwidth five disks are required. With full duplication of all blocks, the five disks can store 23 films which is more than is usually offered in such a system.

The invention is further based on the insight that, although data blocks are stored multiple times, in fact in a typical system less storage units are required in the system according to the invention than in a conventional system. As already shown for above scenarios, bandwidth is the limiting factor for most practical systems and increasingly will be even more so. By no longer striping data blocks across the individual storage units, but instead reading the entire block from one disk, the efficiency in reading data from the storage unit is improved. In the first scenario an efficiency improvement of just over 2% already results in saving a disk.

A further advantage of the system according to the invention lies in the improved robustness of the system. As an example, if one out of twenty disks fails and all blocks are duplicated, the scheduler will on average for one out of twenty blocks not be able to choose from which unit the block should be read. It will be appreciated that as a result the average load on a storage unit will increase by 5.3% and the maximum load on one of the remaining storage units will also increase with a substantially same percentage. In most circumstances where the system is not used by the maximum number of users this will give ample opportunity to replace the failed disk. No other measures such as parity disks are required.

Moreover, the extendibility of the system increases. If additional bandwidth (or storage capacity) is required an additional disk can be added to the system. Next, blocks need to be moved from the already present disks to the new disk. The blocks to be moved may be selected randomly. Typically, the number of blocks to be moved will substantially be the average number of blocks stored on a disk. In the system according to the invention, the impact on the operation of the system is very low. In a 50 disk system only 2% of the blocks need to be moved. All other blocks are entirely unaffected. Also, the moving operation can be performed whenever capacity is available to move a block (i.e. the operation can be performed in the background while the system is operational). As blocks are being moved to the new disk, slowly the capacity of the system increases until finally the desired number of blocks have been moved to the new disk. In contradistinction, for a typical system wherein blocks are striped over all disks, all disks need to be accessed and blocks may even need to be re built in order to store data on the new disk. Such a major operation must usually be performed while the system is off-line.

A disk based storage server for 3D interactive applications, such as an architectural walk through a town like Los Angeles, is described in "Randomized data Allocation for Real-time Disk I/O", Compcon '96 (41st IEEE Computer Society International Conference, Santa Clara, Feb. 25–28, 1996). In this system which considers very large 3D models, at least on the order of a tera byte, the nature of the I/O stream with respect to upper bounds on delay and resource utilisation is very different from video on demand systems where these aspects are (largely) predictable. For this system an unpredictable action of the user determines whether an entirely new portion of the model becomes visible and should be presented to the user. To be able to provide a high peek bandwidth required for presenting a new portion of the model, a data block is typically striped over seven disks forming a group of seven blocks, each occupying one full track on a disk. The group of seven disks are randomly selected from the entire set of available disks. One of the seven blocks is a parity block. The random distribution of the groups results in a statistical variation in the queue lengths. The variability can be decreased by reading only g-1 blocks of a group of g blocks. If the unread block is a data block, the parity block is used to reconstruct the unread block.

The measure as defined in the dependent claim 2 describes a simple scheduling scheme wherein requests for fetching data blocks from the storage medium are handled individually by the scheduler and, typically, in the sequence as they arrive at the scheduler. For each request the scheduler determines, based on the then actual load resulting from already assigned block read requests, to which storage unit the request should be assigned, being the storage unit having the lowest load of all storage units which store the block to be read.

The measure as defined in the dependent claim 3 balances the load by distributing the requests for a group of blocks to be read. This allows for a more even load compared to assigning the requests on an individual basis, where already assigned requests can no longer be influenced. As an example, assigning requests individually may result in the following situation. A request may be assigned to storage unit A which is chosen from two possible storage units A and B, having equal load. The load on a storage unit C is one higher than the initial load on A and B. For a next request a choice has to be made between storage units A and C. Since both A and C now have equal load, what ever choice is made it will always result in increasing the load on one of the storage units. By dealing with both request together in one group, the first request can be assigned to B and the second request to A, resulting in a lower maximum load on the three units. In most systems, the storage units are read in a synchronised manner (i.e. a reading operation is started for all disks at the same time, where the reading itself is performed in one sweeping movement of the head of the disk), implying that an increase of the load of the storage unit with the highest load will result in a longer interval for reading from the storage units. This results in a longer response time for accepting new users.

The measure as defined in the dependent claim 4 describes a simple scheduling scheme for balancing the load for a group of requests wherein requests for fetching data blocks from the storage medium are handled individually by the scheduler and, typically, in the sequence as they arrive at the scheduler. For each request the scheduler determines, based on the then actual load resulting from already assigned block read requests, to which storage unit the request should be assigned, being the storage unit having the lowest load of all storage units which store the block to be read. Furthermore, requests currently being dealt with or already definitely assigned to storage units (e.g. already issued to a hardware read request buffer storing requests for blocks to be read in a next sweeping operation of the disk) do not need to be considered. By ensuring that the load is balanced evenly within each successive group, a relatively even load on the storage units will be maintained as a result of the successive groups.

The measure as defined in the dependent claim 5 allows obtaining a very even load on the storage units. Simulations have shown that by using the initial sequential assignment as described in claim 4 followed by just one round of a sequential reassignment as described in claim 5, the distribution is very close to an optimum. It will be appreciated that the condition for performing a next iteration may simply be a counter (like performing only one re-assignment step), but may also depend on, for instance, the quality of the distribution which has been obtained so-far in view of the maximum load and the average load. The measure as defined in the dependent claim 6 gives a simple criterion being whether the previous iteration step has resulted in an improvement or not.

The measure as defined in the dependent claim 7 describes how based on an analogy with a maximum flow problem an optimum distribution of the load can be achieved.

The measure defined in the dependent claim 8 provides an effective and simple way of achieving an optimal load.

The measure defined in the dependent claim 9 describes that titles are associated with a multiplication factor indicating a level of multiplication of the title. Advantageously, more than one different multiplication factor may be used in the system. For instance, a group of most popular titles is assigned a high multiplication factor (e.g. higher than 2 indicating that for the titles more that twice the amount of blocks are stored than from part of the title), whereas for not regularly accessed films, like old favourites, a low multiplication factor is used (e.g. between using hardly any more blocks for storing the title to using 1.5 times the number of blocks). Simulations have shown that for films with a similar popularity already good results can be achieved with a multiplication factor of approximately 1.75 (i.e. 75% of the blocks during playback are available twice). It will be appreciated that by multiplying the most popular titles an overall multiplication factor of 75% durinh playback is already achieved by duplicating substantially less than 75% of the titles.

It will be appreciated that the title-specific multiplication may also be applied in other systems with some form of storing blocks multiple times. Such a system could be described as a system for retrieving blocks of data, such as audio and/or video data, from a storage medium and supplying the blocks in the form of a plurality of data streams to users; the storage medium comprising a plurality of storage units; a predetermined selection of blocks being stored multiple times in the storage medium by individual blocks of the selection being stored in at least two different and non-overlapping groups of at least one storage unit; the blocks relating to a plurality of titles, each title comprising a sequence of data blocks and being associated with a predetermined multiplication factor; the multiplication factor of a title relating to a ratio of the number of blocks stored in the storage medium for the title and the number of blocks of the title; the system comprising:

a scheduler for controlling reading of blocks for the data streams from the storage medium by, for each block, selecting from a corresponding set of all groups of at least one storage unit in which the block is stored one group from which the block is to be read and assigning a corresponding read request to the selected group; and a reader for, in response to a block read request, reading the corresponding block from the assigned group of at least one storage units for supply in the corresponding data stream to a user.

It will be appreciated that a block may be stored in one single storage unit or stored in a group of more than one storage unit (e.g. striped across a few storage units or the storage medium in order to increase bandwidth). If the block is stored multiple times, then each data element of the block is stored in at least two different storage units (no full overlap). In this way redundancy is achieved, which increases robustness but also allows balancing during playback. If, for instance, a block is striped over a group of two disks (i.e. stored as two sub-blocks SB1 and SB2) and is stored three times, then preferably each of the two different sub-blocks is stored in three different storage units. In this case, if one storage unit fails each subblock is still available from at least two storage units. Preferably, the group of storage units is selected 'randomly' increasing the load balancing during playback. However, the system can also offer advantages for highly non-random storage strategies. A frequently used non-random storage strategy is the so-called round-robing method. In such a system blocks of one title are stored on successive disks in the sequence of playback. As an example, for a system with seven main disks the first block of a title may be stored on disk 1; block 2 on disk 2, ..., block 7 on disk 7, block 8 on disk 1, block 9 on disk 2, etc. achieve redundancy in such a system, typically a parity disk is added (in the example disk 8), where the parity disk stores for each cycle (block 1 to block 7; block 8 to block 15) one parity block calculated over the blocks of the cycle. If all main disks function a cycle requires 7 successive disk accesses (one access to each of the disks). If, however, one of the main disk fails, six normal accesses are still required, with seven additional accesses for the block which can not be read directly (one access to the parity disk and six accesses to the still operational main disks). Consequently, the performance of the system in such a situation almost halves. Alternatively, all six normally accessible blocks of a cycle may be kept in memory and used to reconstruct the block from the unavailable disk in combination with the parity block. This, however, requires a significant increase in memory requirements, typically resulting in the system being able to service considerably less users. By storing blocks multiple times, the robustness of the system is increased. Preferably, the same block is stored optimally 'out-of-phase' to reduce the worst case access delay. As an example, in above described system if the blocks are each stored twice, preferably block 1 is also stored on disk 3 (or disk 4), reducing the worst case delay for a new user to almost half the cycle duration instead of the duration of one cycle. If one of the main disks fails, all blocks are still available. Two of the seven blocks of a cycle will only be available on one disk. The normal round-robin reading scheme can no longer be used. Preferably, for each block it is decided based on the actual load from which storage unit the block should be read. As has been indicated above for a system with random storing of block, balancing is not too severely affected if not all blocks are available multiple times. As such the performance degradation will be slight compared to the traditional round-robin scheme. Storing a block multiple time may increase the storage costs. Such an increase may be (partly) offset by not using separate parity disks. For instance, in a round-robin style system the 20% most popular titles (usually covering at least 80% of the use)

may be stored twice whereas all other titles are only stored once. No parity disk is used any more. If a disk fails, 80% of the users is not affected. The 80% least popular titles need to be retrieved from a back-up storage, such as a tape, possibly affecting 20% of the users. In such a case it may not be possible to serve some or all of these titles until the failed disk has been replaced and rebuild. It will be appreciated that the concept of multiplication relates to one coherent storage medium wherein the storage units are directly accessible and redundancy and load balancing occurs exclusively for that group of storage units. An example of such a storage medium is a disk array with one group of disks, connected via one shared bus to a controller. It will be appreciated that not included is a combination of such a disk array and a back-up storage, such as a tape, which also stores blocks of the titles. In a hierarchical disk array, wherein smaller disk arrays are grouped to form a large disk array, the storage medium relates to either the smaller disk array or the larger whichever is used to store all blocks of one title.

The measure defined in the dependent claim 10 illustrates that a title may be stored multiple times in its entirety (e.g. 2 or 3 times) and that alternatively or additionally a percentage of individual blocks of the title may be stored multiple times. As an example, a multiplication factor of 1.75 may represent that the title can be seen as a sequence of non-overlapping successive groups of four blocks, where three blocks of each group (e.g. the first three blocks) are stored twice and one block (e.g. the last block) is stored once. Similarly a multiplication factor of 2.5 may represent that every 'odd' block of the title is stored twice and every 'even' block is stored three times.

These and other aspects of the invention will be apparent from and elucidated with reference to the embodiments shown in the drawings.

Figure 2:
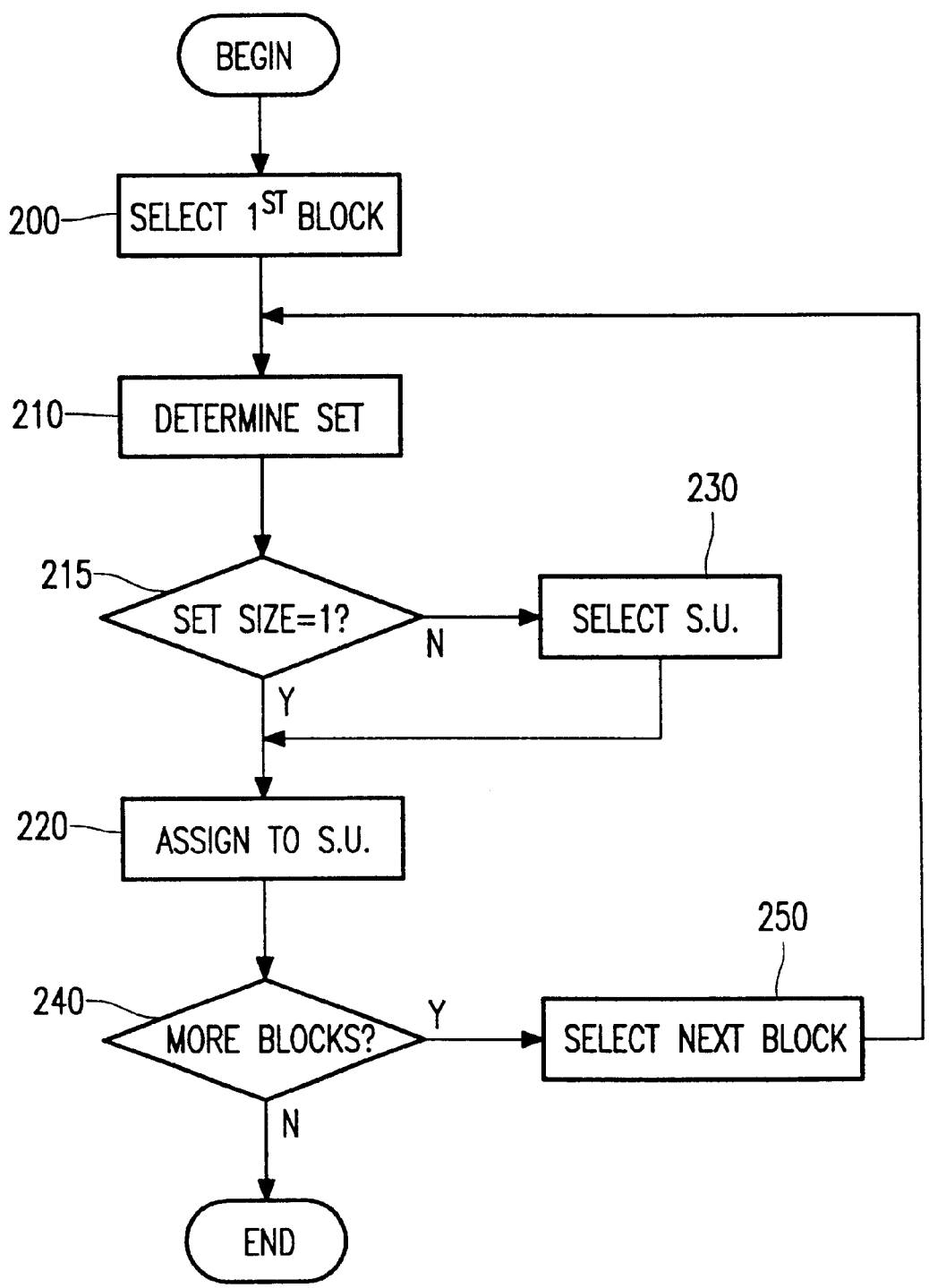
Figure 3:
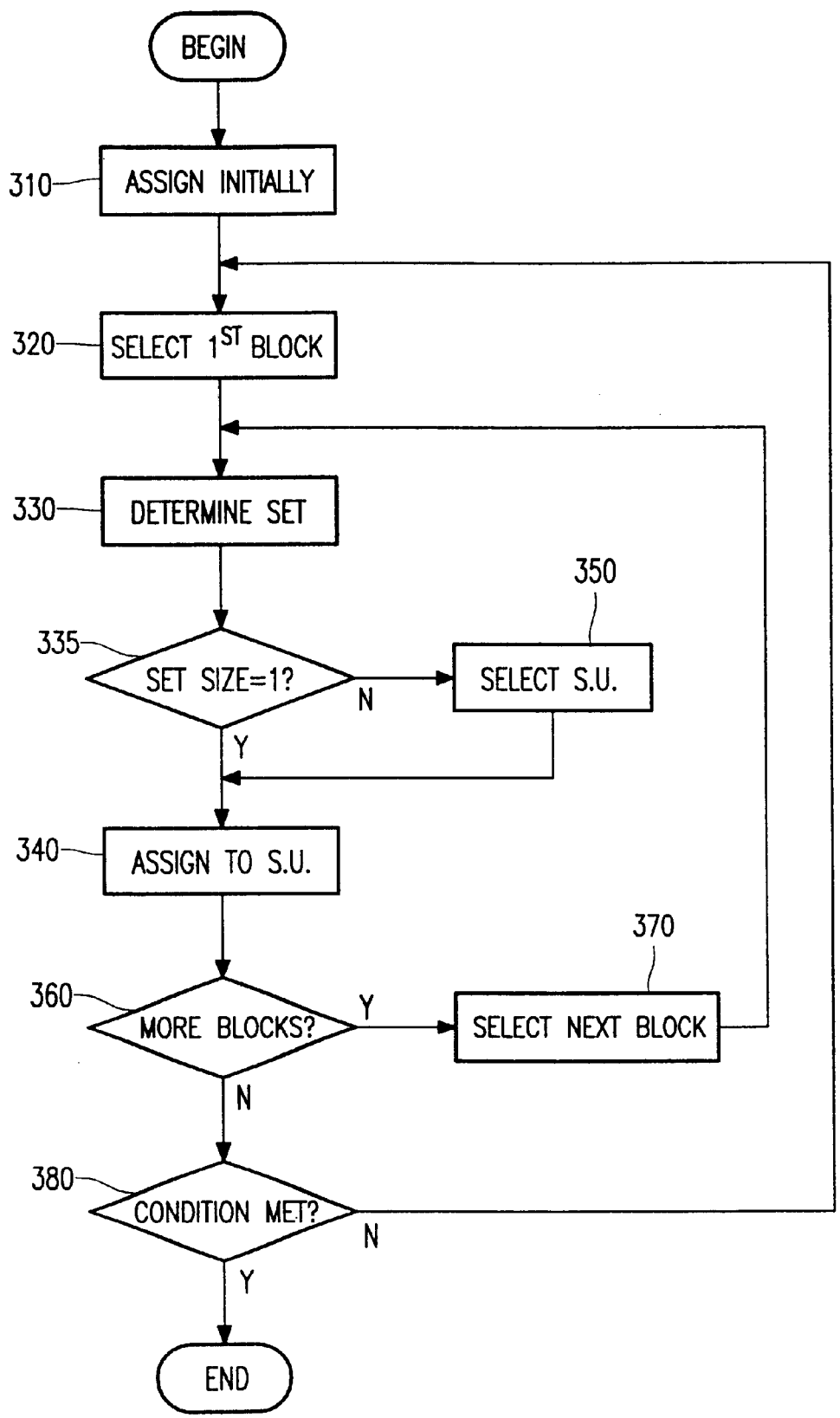
Figure 5:
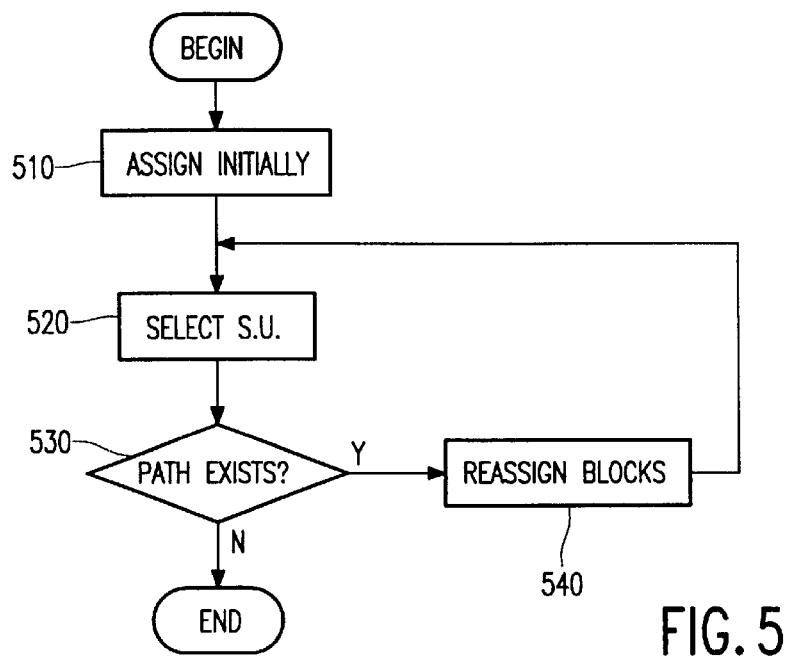
Figure 6:
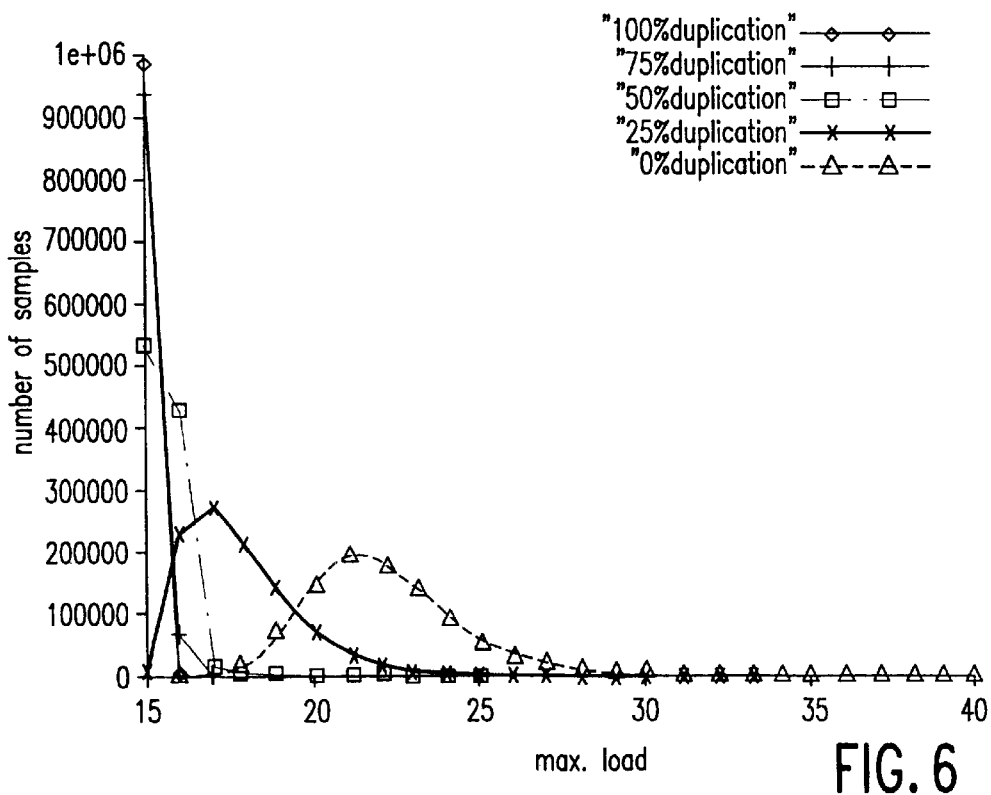

FIG. 1 shows a block diagram of the system according to the invention,

FIG. 2 shows a flow diagram of a linear sequential scheme for selecting storage units for playback, FIG. 3 shows a flow diagram of an iterative linear sequential scheme for selecting storage units for playback, FIGS. 4a, b, c illustrates a scheme for selecting storage units for playback based on solving a maximum flow through a network of nodes, FIG. 5 illustrates an alternative iterative procedure for selecting storage units for playback, and FIG. 6 shows simulated results for a range of multiplication factors from no multiplication of blocks to full duplication of all blocks.

FIG. 1 shows a block diagram of a system 100 according to the invention. An example of such a system 100 is a multimedia server. Multimedia applications can be characterised by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server which is specifically designed to supply continuous data streams of a similar data rate (typically bounded by an identical maximum data rate) for a large number of users in parallel. Usually, one or more multimedia titles are stored on a background storage medium 110. At this moment, normally disks, such as hard disks, are used as the background storage medium 110, based on their large storage capacity at low cost and the possibility of random access. It will be appreciated that also other storage media, such as optical disks, or even solid state memory may be used. The storage medium is divided into a plurality of storage units of which, as an example, are shown 102, 104, 106 and 108. The storage medium 100 is, therefore, formed by a cluster of storage units, such as a RAID system. The storage unit, such as a hard disk, may itself be further sub-divided (resulting in a hierarchical cluster). For the purpose of this description, such a sub-divided storage unit is regarded as one storage unit (with a higher bandwidth and/or higher storage capacity than the sub-units within the storage unit). For a typical video on demand system, which uses disk-based storage media, the number of storage units forming the storage medium 100 is determined by the required bandwidth. Typically, all data streams are bounded by a same maximum consumption rate $R_{max}$ data elements per second, where a data element may for instance be a byte. For MPEG-2 encoded material the maximum consumption rate will typically be chosen to be between approximately 2 or 15 Mbits/sec, depending on the desired quality. A system designed to support simultaneously up to $N_{max}$ data streams requires substantially $N_{max}*R_{max}/B$ storage units, where B is the bandwidth of an individual storage unit. It will be appreciated that in practice the maximum consumption rate for same data streams may be lower, for instance if the corresponding title is of a lower quality or a different type (e.g. audio, whereas most streams relate to a combination of audio and video) than a worse case situation for which the system usually is designed.

The system 100 comprises a reader 180 for reading data from the storage medium 110. The reader 180 may, for instance, be implemented using a SCSI interface. Advantageously, the storage medium 110 is also included in the system 100. For a disk oriented storage medium 100, data is retrieved as a Disk Access Block (DAB). Depending on the chosen scheduling algorithm, a preference may be given to reading data as fixed size DABs or as variable sized DABs. DABs which are successively read from a same disk will typically not be stored contiguously on the disk. Usually, DABs which are successively read from the same disk belong to different files (where a file is the collection of blocks belonging to one title) since the disk has to supply DABs for a plurality of data streams in some interleaved manner. Even if DABs which are to be read successively belong to the same file, according to the invention, successive blocks of a file are not stored contiguously in one storage unit but are distributed randomly over the storage units of the storage medium 110. As a consequence of reading non-contiguous DABs, the disk head needs to be moved in between reading of a DAB and the appropriate starting point of the next DAB has to be awaited. Such a switch takes a considerable time, during which no data can be read. To reduce the switching overhead, the so-called disk sweeping technique is frequently used. In such a scheme, the reader 180 is able to read a number, of for instance eight DABs, from the storage unit 110 in one batch. The DABs of the batch are ordered based on their physical track position. For the read operation, the disk head is moved in only one direction (e.g. from the innermost to the outermost position or vice versa), only stopping to read the DABs of the batch. In this way, the switching overhead is reduced significantly. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100. It will be appreciated that the role of the reader, such as controlling the reading, arranging a sweeping sequence and caching read data, may also be distributed, where each of the storage units has its own controller performing these functions. If so, a main task of the reader 180 is to co-ordinate the operations of the various 'intelligent' control units.

Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. The system according to the invention assumes that for variable data rate streams a fixed identical maximum consumption rate of $R_{max}$ data elements per second is given, which is used for dimensioning the system (e.g. bandwidth of the system and/or size of storage) in order to ensure that the system still operates in a worst case situation (e.g. when all data streams consume data at the maximum data rate). Normally, the data is stored in the storage medium 110 and processed by the system 100 in a compressed form. Only at the user 130 the data stream is decoded, using a decoder. Particularly for a variable rate system, the system 100 may also be able to support VCR like control functions. In such a case, a data stream may be in one of a plurality of states like an active and a halted state, where an active data stream may supply data to a user and a halted data stream may currently not supply data to a user. Typically, if a user temporarily stops consuming data, the streams stay active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated that a slow motion function may be implemented by consuming data at a low rate (the stream remains active) or switching to a new stream (the stream is temporarily halted). The system 100 maintains for the data stream a stream status which indicates the current state. The stream status for one or more data streams may be stored in a status memory 190, such as the main memory (RAM) of the server or special registers.

Data is read from the storage medium 100 for only one data stream at a time or, as described above, for a batch of data streams where the data of the batch is supplied as a time multiplexed stream via the bus 140. In all cases, the storage medium 100 is not capable of simultaneously supplying continuous data streams to all users of the system. Instead, data for a subset of data streams is read and supplied to the remainder of the system 100 at a higher data rate then consumed by the corresponding data streams. The system 100, therefore, comprises buffers 120 for achieving supply of data at the required rate to the users 130. Usually, the buffers 120 are implemented using RAM. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance.

The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 120 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as a filling degree of the buffers, upon which the scheduler 170 bases its decision. For systems which offer VCR-like controls, the scheduler also receives information regarding the status of a stream. In such systems, typically, control information is received from the users 130 via the communication means 150.

In the system according to the invention, a selection of blocks is stored multiple times in the storage medium 110 by being stored in at least two different and randomly selected storage units. The block is multiplicated in full. As a result such a block is available in full from all storage units in which the block is stored (in contradistinction to the use of some form of error detecting or correcting code where part of a block sometimes can be re-generated from other parts stored in other storage units). The blocks may be stored in the storage units off-line (i.e. not while the system is operational in supplying data to users). For instance it may be possible to switch the system (or part of the system) off-line allowing titles to be added (or removed) from the storage units. Alternatively, the storage units may be of a removable type, where a separate system (e.g. located at the owner of the titles or the distributor of the titles to a video on demand server provider) is used for storing the titles on the storage units in the desired manner. Usually, however, the titles will be stored in the storage units while the system is operational. Part of the bandwidth may be reserved for changing titles stored in the storage units or such an operation may be performed at moments when the system is not fully loaded (i.e. when the system is not servicing the maximum number of data streams, like is common during certain parts of the night particularly during week days). The system (or the separate system) comprises means (not shown in the figure) for storing a selection of blocks multiple times in the storage medium, by ensuring that such a block is stored in at least two storage units. Preferably, such a block is stored in exactly two storage units, where the storage units are selected randomly from the set of storage units of the storage medium 110. The selection of the disks is performed separately for each block to be stored multiple times. A (pseudo-)random sequence generator may be used to generate a random number within the range of available storage units. For each successive block of the selection of blocks a next random number indicates the storage unit in which the means stores the block. As will be described below in more detail, selecting the storage units randomly allows a good balancing of the load when retrieving the blocks. Besides selecting the storage unit(s) in a (pseudo-) random manner, the person skilled in the art will be able to design or select a suitable algorithm which for a given system achieves the desired 'randomness' effect. Obviously it is preferred that a block which is stored multiple times is stored each time in a different storage unit, since otherwise the multiplication does not result in an improvement of the load balance (nor in an improvement of robustness). This can simply be achieved by, if a generated random number corresponds to a storage unit which already stores the involved block, using a next random number. It will be appreciated that instead of storing a selected block in two storage units the blocks may also be stored in more storage units. The more storage units are used, the less 'random' the assignment of a block to storage units needs to be. It should be noted that Balanced Allocations" of Y. Azar e.a. ACM Symposium on the Theory of Computing, pp. 593–602, 1994 describes that if n balls are placed in n boxes where for each ball randomly two boxes are selected and the ball is placed into the one which is less full at the moment of placement, with high probability the fullest box contains only ln ln n /ln 2+O(1) balls. This is exponentially less than if the ball was placed in one randomly chosen box, which would result in the fullest box with a high probability containing ln n/ln ln n(1+o(1)) balls. These results demonstrate that, particularly for large number of blocks, duplicating all blocks in full and storing the blocks at random on two disks results in the disks substantially comprising a same number of blocks. For practical purposes, it may be assumed that the number of blocks stored in a specific disk is close to the average number of blocks stored in all disks.

The selection of blocks which are stored multiple times may be all blocks of all titles in the system. Alternatively, the selection of blocks corresponds to all blocks of a subset of all titles in the system. Advantageously, such a subset is formed by the most popular titles (e.g. the collection of titles which cover a predetermined percentage, like 90%, of all accesses by users, or a percentage, such as 10%, of all titles which are accessed most frequently). Alternatively or in combination, the selection of blocks may correspond to a subset of blocks of a title. For instance, every second block of a title is stored multiple times, whereas the other blocks of the title are stored only once. It will be appreciated that many variations are possible. For instance, of a group of three successive blocks of a title, the first block may be stored once, the second block twice, and the third block three times. Also which of the blocks of a group is stored multiple times may differ, e.g. be selected randomly.

In general, the blocks stored in the storage medium 100 relate to a plurality of titles, where each title (usually stored as a file) comprises a sequence of data blocks. Preferably, each title (or a group of titles) is associated with a predetermined multiplication factor. The multiplication factor of a title relates to a ratio of the number of blocks stored in the storage medium for the title and the number of blocks of the title. As an example, if the title comprises N blocks and the title is stored as M blocks (M≧N), then the multiplication factor is given by M/N. For instance if all 1000 blocks of a title (N=1000) are duplicated, resulting in M=2000, then the multiplication factor is 2. Similarly, if all blocks are stored three times, the multiplication factor is 3. As such, the multiplication factor of a title indicates how many times individual blocks of the title are stored in the storage medium. On the other hand, if half of the blocks of a title are stored twice and the other half is stored once, the multiplication factor is 1.5. If three out of four blocks of a title (i.e. 75% of the title) is stored twice and the remaining quarter is stored once, the multiplication factor is 1.75 (M=750*2+ 250*1=1750). In these examples, the multiplication factor of a title indicates which percentage of blocks of the title are stored multiple times in the storage medium. Preferably, the whole part of the multiplication factor (minus one) indicates how many times individual blocks of the title are stored in the storage medium, whereas the remainder indicates a percentage of blocks (less than all blocks) of the title which are stored once more in the storage medium 100. It will be appreciated that other combinations are also possible. For instance if half of the blocks are stored once and the other half are stored three times, the multiplication factor is also 2 (M=500*1+500*3=2000). Such a specific multiplication scheme may be used for specific titles, wherein, for instance, part of the title is accessed very frequently but other parts are usually skipped. It will be appreciated that instead of a multiplication factor of M/N also other multiplication factors may be used which express the degree of multiplication of the selected blocks.

Preferably, the multiplication factor of a title depends on a popularity of the title. Advantageously, for the most popular titles a high multiplication factor is chosen, whereas for 'old favourites' which are accessed less frequently a lower multiplication factor is used. The multiplication factors may be chosen such that for a typical use of the system (i.e. with an average balance between popular and less popular titles) the average multiplication factor is at a desired level. Obviously, the multiplication factor may be chosen for groups of titles, but may also be chosen for individual titles.

The scheduler 170 controls reading of blocks from the storage medium 110. In operation, the scheduler 170 receives a request for reading a new block, for instance, when one of the buffers 125 has room for storing a new block or if one of the users selects a new title. It will be appreciated that the scheduler 170 may also actively check whether the buffers 125 have room for new blocks. When a new block is required, the scheduler 170 determines a set of storage units in which the block is stored. If the block is stored in only one storage unit (i.e. the block does not belong to the selection of blocks which are stored multiple times), the scheduler assigns a read request for reading the block to the storage unit. If the block is stored multiple times, the scheduler 170 chooses one of those storage units and assigns the read request for reading the block to the chosen storage unit. The scheduler selects the storage unit from the set such that the load on the storage units of the storage medium 100 is balanced.

In response to a block read request issued by the scheduler 170, the reader 180 arranges that the corresponding block is read from the assigned storage unit. The read block is stored in one of the buffers 125 which corresponds to the data stream for which the block is read for supply to a user.

In a simple embodiment of the system according to the invention, the scheduler deals with a request for fetching a block for a data stream on an individual basis. Whenever a request arrives (or the scheduler 170 detects on its own initiative that a new block is required), the scheduler 170 selects from the corresponding set the storage unit which at that moment has a lowest load. No reassignment takes place of previous read requests, nor is any consideration given to requests for fetching a block which may already have arrived at the scheduler. The only influence of previous block requests is via the load of the storage units, which is determined based on the block read requests, which have already been assigned but for which no block has been read yet. It will be appreciated that in practical circumstances, the scheduler 170 can only take into consideration assigned block requests of which the scheduler 170 is still able to determine the status. As an example, the reader 180 (or individual controllers of the storage units) may be able to perform in hardware some form of internal scheduling to optimise the sweeping sequence. Once a read request has been issued, the scheduler 170 may no longer be able to determine when the actual block is going to be read or is being read. As such, the scheduler 170 may regard such block read requests as being completed and no longer contributing to the load.

In an alternative embodiment of the system according to the invention, the scheduler 170 balances the load on the storage units by dealing with a group of more than one request for fetching a block at a time. Not only does this allow for a better balance, it also matches a cyclical approach commonly used in video servers, where in each cycle it is first determined for which data streams a block needs to be read, next the corresponding block read requests are assigned, and finally the blocks are read in one sweeping operation. The sweeping operation may optionally be synchronised for all storage units. According to the invention, the scheduler 170 first determines a group of blocks to be read within a next cycle. Next, the scheduler 170 selects for all blocks of the group from which storage unit the block should be read such that the load on the storage units is balanced and assigns a corresponding read request. Finally, the scheduler 170 causes the reader 180 to read the corresponding blocks from the assigned storage units. By only considering the load resulting from assignments for the group, the load can at least be balanced for the involved storage units (i.e. those storage units comprising a copy of one of the blocks to be read). Since typically the group will be considerably larger than the total number of storage units, usually all storage units will be involved. Alternatively, the scheduler 170 may also consider the load resulting from an assignment of a previous group, if those blocks have not all been read yet. As described above, normally block read requests will only be issued by the scheduler 170 around the time the reader 180 has read all blocks for the previous group. In such an approach, it is sufficient to only balance the load resulting from blocks of the group since there is no load left resulting from other groups.

FIG. 2 illustrates a flow diagram of the operation of the scheduler 170 in a further embodiment of the system according to the invention, wherein the scheduler sequentially deals with the blocks of the group. It is assumed that some sequence exists in the blocks. The sequence itself is not important. The sequence may, for instance be, the sequence in which the scheduler 170 receives the request for fetching the block. An alternative sequence may be based on the sequence of the buffers for which the block is intended. Preferably, for a system using different multiplication factors, the sequence is determined by the multiplication factor, where read requests for blocks with a low multiplication factor are assigned first and requests for blocks with a high multiplication factor last. In this way freedom for choice is available for all blocks (for the first blocks since the storage units are not yet highly loaded; for the last blocks due to the choice resulting from the higher level of multiplication), resulting in a better load balance. In step 200 the scheduler selects a first block of the sequence. A selected block is processed in steps 210, 220 and optionally 230. In step 240 the scheduler 170 tests whether all blocks of the group have been processed. If so, the operation is finished. If not, in step 250 a next block of the group is selected and the process is continued at step 210. For each block, the scheduler 170 determines in step 210 a set of storage units in which the block is stored. In step 215 an optional test is performed which may be used in systems in which not all blocks are stored multiple times. If the block is stored in only one storage unit (i.e. the block does not belong to the selection of blocks which are stored multiple times), the scheduler assigns in step 220 a read request for reading the block to the storage unit. If the block is stored multiple times, the scheduler 170 chooses in step 230 one of the storage units from the set and assigns in step 220 the read request for reading the block to the chosen storage unit. The scheduler selects the storage unit which at that moment has a lowest load resulting from block read requests which have already been assigned for previously processed blocks of the group. This algorithm is further referred to as the Linear Assignment algorithm.

FIG. 3 shows a flow diagram of the operation of the scheduler 170 in a further embodiment of the system according to the invention. In step 310, the scheduler 170 performs an initial assignment. The scheduler selects for each of the blocks of the group a preliminary storage unit and assigns the corresponding block read request to the preliminary selected storage unit. The selection process may be simple, like always selecting a first storage unit from the set (where the storage units are considered to be sequentially arranged) or randomly selecting a storage unit from the set of storage units. Preferably, the initial assignment of step 310 is performed using the sequential assignment scheme of FIG. 2 which considers the balance within the group. Following the initial assignment, the scheduler 170 starts an iterative procedure wherein for each block of the group a storage unit is re-selected and the corresponding block read request re-assigned. Preferably, the re-assignment is performed in the following way, which corresponds to the scheme shown in FIG. 2. Assuming again that some sequence exists in the blocks, the scheduler 170 selects in step 320 a first block of the sequence. A selected block is processed in steps 330, 340 and 350. In step 360 the scheduler 170 tests whether all blocks of the group have been processed. If so, a loop of the iterative procedure has finished. If not, in step 370 a next block of the group is selected and the process is continued at step 330. In step 380, the scheduler 170 checks whether a condition for terminating the loop has been met. If so, the loop is exited, otherwise a next loop is started at step 320. The condition itself may be a simple condition, like whether the loop has been executed a predetermined number of times or whether the maximum load resulting from the last loop is the same as before the loop was started. For each block, the scheduler 170 determines in step 330 in which set of storage units the block is stored. In step 335 an optional test is performed which may be used in systems in which not all blocks are stored multiple times. If the block is stored in only one storage unit (i.e. the block does not belong to the selection of blocks which are stored multiple times), the scheduler assigns in step 340 a read request for reading the block to the storage unit. If the block is stored multiple times, the scheduler 170 chooses in step 350 one of the storage units from the set and assigns in step 340 the read request for reading the block to the chosen storage unit. The scheduler 170 selects the storage unit which at that moment has a lowest load resulting from block read requests which have already been assigned for previously processed blocks of the group. This algorithm is further referred to as the Linear Reassignment algorithm, wherein the initial assignment is performed by the Linear Assignment algorithm.

In a further embodiment according to the invention, the scheduler 170 assigns block read requests for the blocks of the group according to an assignment derived from solving an analogous maximum flow problem. Like in step 310 of FIG. 3, the scheduler 170 first performs an initial assignment by selecting for each of the blocks of the group a preliminary storage unit and assigning the corresponding block read request to the preliminary selected storage unit. An analogous maximum flow problem is defined in the following way. A network of nodes $n_i$ is defined containing for each storage unit $s_i$ a corresponding node (vertex) $n_i$. The network also comprises a source node (s) and a drain (or: sink) node (d). Each node $n_i$ is connected to $n_j$ ($n_i \neq n_j$) via a corresponding arc (directed edge) with a capacity corresponding to the number of blocks which are stored in both $s_i$ and $s_j$ and for which the corresponding block read request has been assigned to $s_i$. As such the capacity indicates the number of blocks that can be re-assigned from $s_i$ to $s_j$. FIG. 4A illustrates a network for three storage units $s_1$ to $s_3$, represented by the respective nodes $n_1$ to $n_3$. In the example, it is assumed that the respective initial loads on the storage units $s_1$ to $s_3$ are 15, 12 and 10 (as indicated in the center of each corresponding node). Next to each arc from one node to another is indicated how many block read requests can be reassigned between the storage units corresponding to the nodes (e.g. in the example, three blocks can be re-assigned from $s_1$ to $s_3$ and two from $s_3$ to $s_j$. The problem is defined such that it can be determined whether the maximum load $l_{max}$ on the storage units can be lowered with k units, where the load results from the preliminary assignment of block read requests to the storage units. To this end, the source s is connected to each node $n_i$ via a corresponding arc with a capacity of max(k+$l_i$ −$l_{max}$, 0). In this formula, $l_i$ corresponds to a load on storage unit si resulting from the block read requests which have been preliminary assigned to $s_i$. Consequently, the maximum load $l_{max}$ is given by $l_{max}$= max{$l_i$} over all storage units. In the example of FIG. 4A, $l_{max}$=15. Furthermore, each node $n_i$ is connected to the drain d via a corresponding arc with a capacity of max($l_{max}$−$l_i$−k, 0). In the example of FIG. 4A, k is chosen to be 2 and the corresponding capacities of the source to the respective nodes and from the nodes to the drain are shown. Next, the maximum flow through the network is calculated. FIG. 4B shows a possible outcome of the calculated flow. Next to each arc the flow is indicated (unlike FIG. 4A where the capacity was indicated). The flow in an arc may not exceed its capacity. The capacities of the arcs from the source s to the respective nodes have been defined such that if and only if the calculated flow from the source s to the respective nodes matches the capacity (i.e. the capacity is fully used), the maximum load indeed can be lowered by k units. As an example, if the load on a node equals the maximum load $l_{max}$, it is desired to lower the load on this node with k units, reflected by a capacity of max(k+$l_i$−$l_{max}$, 0)=max(k+$l_{max}$−$l_{max}$, 0)=k. Similarly, for a node with a load of $l_{max}$−1 it is desired to lower the load with k−1 unit, reflected by a capacity of max(k+$l_{max}$−1−$l_{max}$, 0)=max(k−1, 0)=k−1 (assuming k>=0). The formula also expresses that a load on a node of $l_{max}$−k (or even lower) does not need to be lowered. Similarly, the capacities of the arc from the respective nodes to the drain d express with how many units the load on the nodes can be increased without exceeding the desired maximum load of $l_{max}$−k. It will be appreciated that the calculated flow from the nodes to the drain may be lower than the respective capacities, reflecting that the system is not fully loaded (in FIG. 4B the flow from $n_3$ to the drain is 1, whereas the capacity is 3, indicating that the load on $n_3$ may still be increased by up to two more blocks). If the calculated maximum flow shows that the maximum load can be lowered by k units, the scheduler 170 re-assigns a number of block read requests from $s_i$ to $s_j$ ($s_i \neq s_j$) that equals the resulting calculated flow from $n_i$ to $n_j$. FIG. 4C shows a re-assignment according to the calculated flows shown in FIG. 4B. For calculating the maximum flow through the network any suitable algorithm, such as the well-known Ford&Fulkerson algorithm, may be used. Details of maximum flow principles are described in "Algorithmic Graph Theory", Alan Gibson, Cambridge University Press, 1989, pages 96–106.

The maximum load on storage units of a well balanced system will be in between (including the boundaries) the upwardly rounded average load $l_{avg}$ on the storage units and the maximum load $l_{max}$ resulting from the preliminary assignment. So, k may be chosen between 1 and $l_{max}$−$l_{avg}$ (if $l_{max}$ equals $l_{avg}$ the load can not be lowered). To determine the maximum value for k for which the maximum load still can be lowered, various schemes may be used. For instance, starting at one of the boundaries successively all values of k may be tried until the desired result is reached, e.g. starting with k=$l_{max}$−$l_{avg}$ the maximum flow is calculated; if not successful k is lowered until successful or the last value of k (k=1) has been unsuccessfully tried. Also a 'binary search' may be performed, where k is chosen to be approximately in the middle of interval. If successful, the process is repeated with the upper half of the interval, otherwise with the lower half of the interval. The process is repeated until the value of k is reached.

In an embodiment of the system according to the invention, a same result as obtainable by solving the described algorithm based on the maximum flow problem, is achieved by the scheduler 170 performing an iterative procedure, which is illustrated in FIG. 5. Like before, the first step 510 is to perform an initial assignment by selecting for each of the blocks of the group a preliminary storage unit and assigning the corresponding block read request to the preliminary selected storage unit. Following the initial assignment, the scheduler 170 starts an iterative procedure wherein an attempt is made to reassign a block read request from a storage unit with maximum load to a storage unit with a load less than $l_{max}$−1. The reassignment may be direct from one storage unit to another, but also a chain of reassignments may occur. In step 520 the scheduler 170 selects a storage unit $s_i$ with a load on $s_i$ being equal to a maximum load $l_{max}$ on the plurality of storage units. The load results from currently assigned block read requests. It will be appreciated that more than one storage unit may have the maximum load. If so, any of these may be selected (e.g. the first one of these). In step 530 the scheduler determines whether a path exists from $s_i$ to a different storage unit $s_j$ with a load less than $l_{max}$−1. It is intended to move one read request from $s_i$ to $s_j$ via the path, reducing the load on $s_i$ with one and increasing the load on $s_j$ with one. To get an improvement the resulting load on $s_j$ should be less than $l_{max}$, implying that the initial load on $s_j$ should be less than $l_{max}$−1. To be able to move a read request along the path, the path is formed by a sequence of storage units $s_{p1}, s_{p2}, \ldots, s_{pl}$, with $s_i = s_{p1}$ and $s_j = s_{pl}$ and wherein for each pair $s_{pk}$, $s_{p(k+1)}$ a block read request can be reassigned from $s_{pk}$ to $s_{p(k+1)}$, with k ranging from 1 to l−1. Any suitable algorithm may be used for determining whether such a path exists. As an example, a graph as illustrated in FIG. 4 for the storage units $s_1$ to $s_3$ (represented by nodes $n_1$ to $n_3$) may be formed and a tree search performed through the graph. If a path exists, the scheduler 170 reassigns in step 540 a block read request from $s_{pk}$ to $s_{p(k+1)}$ for k ranging from 1 to l−1. Next, the procedure is restarted at step 520. At that moment the load on $s_i$ has been lowered by one. If still other storage units have a same maximum load as si had before, one of these units will be selected in step 520. If $s_i$ was the only storage unit (or the last storage unit) with that maximum load, this will automatically have lowered the maximum load on the system with one. As a result $s_i$ now again has a maximum load (which usually also some other storage units have), albeit one lower than before. This process is repeated until for a storage unit no path can be found for lowering the load.

The behavior of three algorithms according to the invention, being Linear Assignment (LA), Linear Reassignment and Maximum Flow Assignment (MFA), has been simulated. For m=5 to 30 disks (in steps of 5) a simulation has been performed, wherein further the number of active streams has been varied with the number of streams divided by the number of disks ranging from 5 to 30 (in steps of 5). As such, the number of active streams in the system ranges from 25 to 900. The following table shows the results of the simulation for a 1,000,000 successive sweeps. All blocks have been fully duplicated and in each sweep a data block is fetched for each active stream, reflecting a worst case scenario wherein all streams continuously consume at the maximum rate. Of each group of three results shown in the table, the top result relates to the LA algorithm, the middle result to the LR algorithm and the lower result to the MFA algorithm. Each result shows the maximum observed load, where the number of times that the maximum load is observed is given between parentheses.

The simulations show that with the relatively simple LR algorithm good results can be achieved within almost all situations a same maximum load as obtained with the MFA algorithm (which gives the best load balance achievable), although the number of times the maximum load is observed is higher than for the MFA algorithm. The simulations also demonstrate that by fully duplicating blocks and storing the blocks randomly, a maximum load can be achieved which, particularly for the LR and MFA algorithm, is for most simulated situations only 3–10% higher than the average load, which is the lower limit. As such the balancing which can be achieved is very good.

The following table shows the average maximum observed load for the same simulations, confirming that, particularly for larger systems, the maximum load on average approaches the average load on all disks.

|  | #Streams/#disks | | | | | |
|---|---|---|---|---|---|---|
| #Disks | 5 | 10 | 15 | 20 | 25 | 30 |
| 5 | 8(18) | 13(31) | 18(29) | 23(34) | 28(25) | 33(28) |
|  | 7(51) | 12(21) | 17(1) | 21(1776) | 26(381) | 31(68) |
|  | 7(41) | 12(21) | 17(1) | 21(18) | 26(3) | 30 |
| 10 | 8(142) | 13(191) | 18(207) | 23(184) | 28(198) | 33(166) |
|  | 7(54) | 11(396117) | 16(213706) | 21(114426) | 26(61619) | 31(32999) |
|  | 7(1) | 11(23661) | 16(3193) | 21(501) | 26(55) | 31(11) |
| 15 | 8(347) | 13(409) | 19(1) | 23(441) | 28(440) | 33(447) |
|  | 7(96) | 11(694889) | 16(488578) | 21(336106) | 26(228820) | 31(156811) |
|  | 6(313653) | 11(46707) | 16(7107) | 21(1113) | 26(173) | 31(28) |
| 20 | 8(595) | 14(1) | 18(745) | 23(728) | 28(718) | 33(719) |
|  | 7(147) | 11(858807) | 16(692840) | 21(538545) | 26(413701) | 31(314418) |
|  | 6(421558) | 11(70447) | 16(11215) | 21(1836) | 26(327) | 31(52) |
| 25 | 8(874) | 13(995) | 18(981) | 23(1059) | 28(1034) | 33(1033) |
|  | 7(242) | 11(936186) | 16(822812) | 21(692345) | 26(570789) | 31(464858) |
|  | 6(512112) | 11(93623) | 16(15619) | 21(2771) | 26(445) | 31(79) |
| 30 | 8(1134) | 13(1327) | 18(1400) | 23(1340) | 28(1341) | 33(1363) |
|  | 7(297) | 12(1) | 16(900205) | 21(799922) | 26(693882) | 31(591426) |
|  | 6(589538) | 11(116981) | 16(20072) | 21(3476) | 26(648) | 31(134) |

|  | #Streams/#disks | | | | | |
|---|---|---|---|---|---|---|
| #Disks | 5 | 10 | 15 | 20 | 25 | 30 |
| 5 | 5.814579 | 10.816288 | 15.817238 | 20.816758 | 25.816466 | 30.817494 |
|  | 5.189416 | 10.039058 | 15.008097 | 20.001776 | 25.000381 | 30.000068 |
|  | 5.048722 | 10.003749 | 15.000340 | 20.000018 | 25.000003 | 30.000000 |
| 10 | 6.080048 | 11.084611 | 16.085411 | 21.085007 | 26.085770 | 31.085666 |
|  | 5.708342 | 10.396117 | 15.213706 | 20.114426 | 25.061619 | 30.032999 |
|  | 5.186373 | 10.023661 | 15.003193 | 20.000501 | 25.000055 | 30.000011 |
| 15 | 6.174325 | 11.183523 | 16.184458 | 21.184632 | 26.184390 | 31.184253 |
|  | 5.916536 | 10.694889 | 15.488578 | 20.336106 | 25.228820 | 30.156811 |
|  | 5.313653 | 10.046707 | 15.007107 | 20.001113 | 25.000173 | 30.000028 |
| 20 | 6.258065 | 11.270981 | 16.271679 | 21.271963 | 26.271858 | 31.271882 |
|  | 5.977383 | 10.858807 | 15.692840 | 20.538545 | 25.413701 | 30.314418 |
|  | 5.421558 | 10.070447 | 15.011215 | 20.001836 | 25.000327 | 30.000052 |
| 25 | 6.334812 | 11.350392 | 16.351189 | 21.352367 | 26.352205 | 31.351932 |
|  | 5.994365 | 10.936186 | 15.822812 | 20.692345 | 25.570898 | 30.464858 |
|  | 5.512112 | 10.093623 | 15.015619 | 20.002771 | 25.000445 | 30.000079 |
| 30 | 6.403893 | 11.421406 | 16.424479 | 21.423658 | 26.424140 | 31.423777 |
|  | 5.998830 | 10.972260 | 15.900205 | 20.799922 | 25.693882 | 30.591426 |
|  | 5.589538 | 10.116981 | 15.020072 | 20.003476 | 25.000648 | 30.000134 |

FIG. 6 illustrates simulated results for the MFA algorithm for 1,000,000 successive sweeps, with 15 disks and 225 active data streams (resulting in an average load of 15 streams per disk), where the multiplication factor is varied, from 1 (no multiplication) to 2 (full duplication). A multiplication factor of 1.25 (25% duplication) indicates that of 1 out 4 blocks was duplicated. The figure shows how many times (vertically) a maximum load (horizontally) was observed. For a system wherein each block is stored only once (0% duplication), the figure shows that the observed maximum loads lie substantially between 18 and 28 streams per disk, with maximum loads well above 30 occurring occasionally. It will be appreciated that if such a scheme is chosen, such a system would have to be dimensioned for being able to deal with approximately 30 streams per disk, while the average load is only 15 streams per disk, giving an over-dimensioning of a factor of 2. For a system with a duplication factor of 50%, the observed maximum loads lie substantially between 15 and 18 streams per disk. Dimensioning such a system for, for instance, 20 streams per disk (an over-dimensioning of 33%) will hardly ever give a conflict (i.e. a maximum load above 20). As such, FIG. 5 illustrates that for systems in which storage capacity is a limiting factor, good results can be achieved with a duplication degree of less than 100%. Simulations show that a duplication degree ranging from approximately 60–80% gives already good results. In such a case, the over-dimensioning can be less than 25% and for larger systems even well below that. For a 100% duplication, for the LR and MFA algorithm a system with 15 disks and dimensioned to support 16 streams per disk (a 6.7% over-dimensioning) can, without any observed problem in the simulations, support 225 streams (on average 15 streams per disk). It has to be realised that in practical circumstances, the results will be even better. The simulations have been performed assuming the worst case situation wherein all streams consume data at the maximum consumption rate, and the disk performance is at the lowest specified. In practice, the disk performance will be better and, for variable consumption rate systems, the average consumption rate will be well below the maximum consumption rate. Consequently, particularly for larger systems, the level of over-dimensioning can be lowered even further.

What is claimed is:

1. A video server, comprising:
   means for storing a predetermined selection of blocks multiple times in the storage medium by storing individual blocks of the selection in their entirety in a set of at least two different and substantially randomly selected storage units of the medium;
   scheduler means for selecting from a corresponding set of all storage units in which the block is stored, one storage unit from which the block is to be read so as to balance the load on the plurality of storage units; and for assigning a corresponding read request to the selected storage unit and
   reader means for, in response to a block read request, reading the corresponding block from the assigned storage unit for supplying a corresponding data stream to a user.

2. A system as claimed in claim 1, wherein the scheduler means is for, in response to a request for fetching a block for a data stream, selecting from the corresponding set the storage unit which at that moment has a lowest load resulting from already assigned block read requests.

3. A system as claimed in claim 1, wherein the scheduler means is for balancing the load on the plurality of storage units by cyclically:
   determining a group of blocks to be read within a next cycle;
   performing the selecting and assigning for all blocks of the group such that the load on the plurality of storage units resulting from the assigned block read requests is balanced; and
   causing the reader means to read the corresponding blocks from the assigned storage units.

4. A system as claimed in claim 3, wherein the scheduler means is for performing the selecting and assigning by processing the blocks of the group in sequence and for each block:
   selecting from the corresponding set the storage unit which at that moment has a lowest load resulting from block read requests which have already been assigned for blocks of the group; and
   assigning the corresponding block read request to the selected storage unit.

5. A system as claimed in claim 3, wherein the scheduler means is for selecting, for each of the blocks of the group, a preliminary storage unit and assign the corresponding block read request to the preliminary selected storage unit, and for iteratively re-selecting a storage unit and re-assigning the corresponding block read request until a predetermined condition is met, by processing the blocks of the group in sequence and for each block:
   selecting from the corresponding set the storage unit which at that moment has a lowest load resulting from block read requests which have already been assigned for blocks of the group; and
   assigning the corresponding block read request to the selected storage unit.

6. A system as claimed in claim 5, wherein the condition is that a maximum load on at least one of the storage units is the same as a maximum load on at least one of the storage units at the end of a previous iteration.

7. A system as claimed in claim 3, wherein the scheduler means is for selecting, for each of the blocks of the group, a preliminary storage unit and assigning the corresponding block read request to the preliminary selected storage unit, and, for re-selecting for blocks of the group, a storage unit and re-assigning the corresponding block read request by:
   determining whether a maximum load resulting from the preliminary assignment of block read requests can be lowered by k units, by:
   solving a maximum flow problem by calculating a maximum flow from a source to a drain through a network of nodes $n_i$, wherein for each storage unit $s_i$, a corresponding node $n_i$ is defined; the source is connected to each node $n_i$ via a corresponding arc with a capacity of $\max(k+l_i-l_{max}, 0)$, where $l_i$ corresponds to a load on storage unit $s_i$ resulting from the block read requests which have been preliminary assigned to $s_i$ and $l_{max} = \max\{l_i\}$; each node $n_i$ is connected to $n_j$ ($n_i \neq n_j$) via a corresponding arc with a capacity corresponding to the number of blocks which are stored in both $s_i$ and $s_j$ and for which the corresponding block read request has been assigned to $s_i$; and each node $n_i$ is connected to the drain via a corresponding arc with a capacity of $\max(l_{max}-l_i-k, 0)$; and
   deciding that the maximum load can be lowered by k units if a calculated maximum flow through the network is such that the flow from the source to each node $n_i$ equals $\max(k+l_i-l_{max}, 0)$; and
   if the maximum load can be lowered by k units, re-assigning a number of block read requests from $s_i$ to $s_j$ ($s_i \neq s_j$) that equals the resulting calculated flow from $n_i$ to $n_j$.

8. A system as claimed in claim 3, wherein the scheduler means is for selecting, for each of the blocks of the group, a preliminary storage unit and assigning the corresponding block read request to the preliminary selected storage unit, and, for blocks of the group, for re-selecting a storage unit and re-assigning the corresponding block read request by:

iteratively:
- selecting a storage unit si with a load on $s_i$ being equal to a maximum load $l_{max}$ on the plurality of storage units, where the loads result from currently assigned block read requests;
- determining whether a path exists from $s_i$ to a storage unit $s_j$ with a load less than $l^{max}-1$, where the path is formed by a sequence of storage units $s_{p1}, s_{p2}, \ldots, s_{p1}$, with $s_i=s_{p1}$ and $s_j=s_{p1}$ and wherein for each pair $s_{pk}, s_{p(k+1)}$ a block read request can be reassigned from $s_{pk}$ to $s_{p(k+1)}$, with k ranging from 1 to 1-1; and
- if a path exists: reassigning a block read request from $s_{pk}$ to $s_{p(k+1)}$ for k ranging from 1 to 1-1;

until no path exists.

9. A system as claimed in claim 1, wherein the blocks relate to a plurality of titles, each title comprising a sequence of data blocks and being associated with a predetermined multiplication factor; the multiplication factor of a title relating to a ratio of the number of blocks stored in the storage medium for the title and the number of blocks of the title.

10. A system as claimed in claim 8, wherein the multiplication factor of a title determines how many times individual blocks of the title are stored in the storage medium and/or which percentage of blocks of the title are stored multiple times in the storage medium.

* * * * *